Feb. 14, 1956 D. O. HENDRIX 2,734,419
INTERFEROMETER
Filed July 11, 1952

OPERATOR'S
POSITION

INVENTOR.
DON O. HENDRIX
BY
Attorney

United States Patent Office 2,734,419
Patented Feb. 14, 1956

2,734,419

INTERFEROMETER

Don O. Hendrix, Pasadena, Calif., assignor to Davidson Manufacturing Company, Los Angeles, Calif., a firm Application July 11, 1952, Serial No. 298,331

4 Claims. (Cl. 88—14)

This invention relates generally to interferometers, and its object is to provide an improved, simplified and more versatile form of general purpose interferometer.

The interferometer of the present invention employs an auto-collimator, in whose parallel beam is placed a dividing mirror, splitting the beam into two branches, which travel to the usual two fully reflective mirrors. The lens of this auto collimator serves as both collimator lens and telescope objective. A beam splitter is placed in the spherical wave front collimator beam near the focus. The eye is placed at the focus of the lens, and a light source consisting of a small hole, illuminated by monochromatic light, is reflected in by the beam splitter, its distance from the lens being, of course, equal to the focal length of the lens. In effect, the beam splitter affords two focal points or positions, and the eye is placed at one, while the light source is placed at the other.

In addition, in a preferred form, the spherical front collimator beam is reflected at right angles to turn the optic axis of the collimator parallel to and alongside one of the branches of the mirror system. This greatly compacts the system, and brings the eye position close to the mirror system, enabling the operator to adjust the position of a test piece, or mirror, with one hand, while remaining in a position to look conveniently into the telescope objective. A great deal of space is thereby saved, and the work of the operator is greatly convenienced.

Still another advantage is the ability to rotate the dividing mirror about the axis of the collimated beam, so as to swing the axis of one mirror branch to or toward a vertical axis. This permits checking of an optical element of an assembled instrument, in cases wherein the instrument is otherwise too large to be accommodated by the interferometer, or in cases where it is convenient or necessary, because of the nature of the optical element, that the reflected beam be at an angle to horizontal.

The invention will be more fully understood from the following detailed description of a diagrammatically illustrated present illustrative embodiment, reference being had to the accompanying drawings, wherein.

Figure 1:
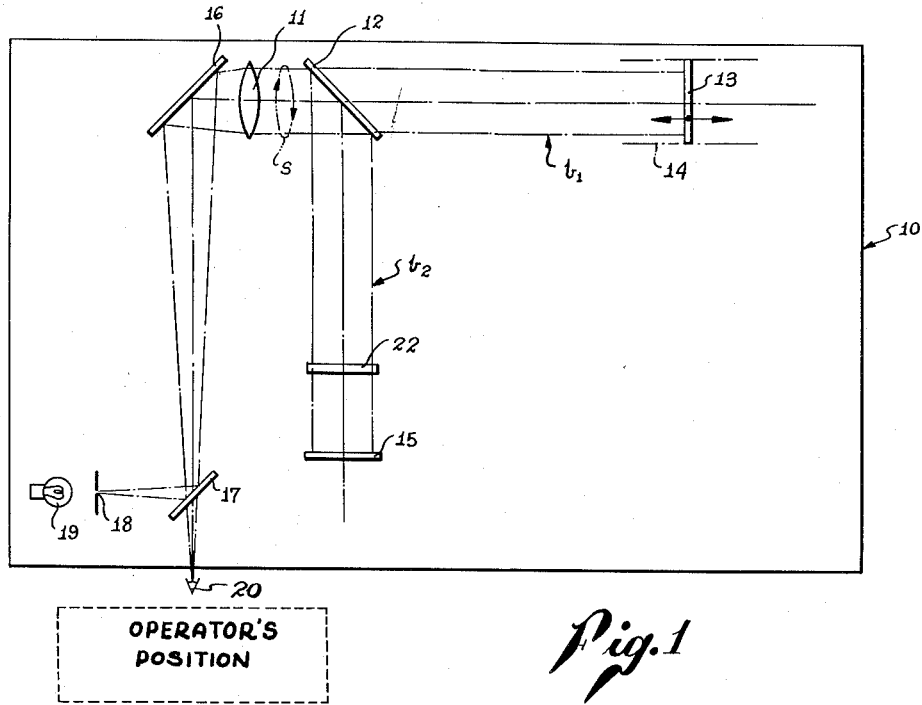
Figure 1 is a diagrammatic plan view of an interferometer in accordance with the invention.

In Figure 1 of the drawings, numeral 10 designates generally a suitable smooth surfaced horizontal base of rectangular outline. A very good base consists of a heavy granite slab, about 20" x 30", smooth surfaced on its top face.

Mounted on this base are the optical elements of the interferometer, and since the physical mounting and adjusting arrangements may be conventional, or can readily be provided by those skilled in the art, and are not considered as forming any part of the invention, such arrangements will not be structurally indicated, but only diagrammatically represented.

In the specific layout of Figure 1, the lens 11 of an auto collimator is mounted on base 10 near the rearward left-hand corner of the latter, with its longitudinal axis parallel to the rearward edge of the base. Beyond lens 11, and on its axis, are mounted a usual half-reflective dividing mirror 12, half-reflective on its front face 12a, as indicated, and beyond mirror 12 is a longitudinally adjustable fully reflective mirror 13, the latter being afforded with precision guide tracks 14 on the base, and with any conventional means for precision adjustment movement along said tracks. The dividing mirror 12 is disposed at 45° to the axis of the collimator lens, and may be stationarily mounted in the position shown. It is a feature of the invention, however, that the dividing mirror can be arranged for rotation about the axis of the collimated beam, always, of course, retaining its 45° relation to said beam, and the provision of this rotatable adjustment feature is indicated in the drawings by the dot-dash circle $s$.

The path from light splitter 12 to mirror 13 comprises one mirror branch $b_1$ of the system. At right angles to the longitudinal axis of lens 11, and extending forwardly, or towards the operator, from dividing mirror 12, is the other mirror branch $b_2$ of the system, leading to a fully reflective mirror 15 whose position may be readily adjusted about on the surface of the base 10.

Preferably, the auto collimator has a right angle bend at the rearward left-hand corner of the base, accomplished with use of mirror 16, so that the greater part of its length extends towards the operator, parallel with the left-hand edge of the base, and parallel to or alongside the mirror branch $b_2$. It will be noted that the arrangement described has the mirror 16 at right angles to the dividing mirror 12. A small beam splitter 17 is mounted just short of the focal distance of the lens 11, and a light source comprising a small hole 18, e. g., .040" in diameter, positioned in front of a source 19 of monochromatic light, is located before this beam splitter at the focal distance of the lens 11. The eye 20 of the observer is positioned at the focal point of lens 11, so as to observe the convergent rays from lens 11 through the beam splitter 17.

In use, monochromatic light from the small illuminated hole 18 is formed into a parallel beam by lens 11 and projected upon dividing mirror 12, where it branches into two parallel beams, one following branch $b_1$ to mirror 13, and the other following branch $b_2$ to mirror 15. The beams reflected by the mirrors are recombined at 12, returned through lens 11, and viewed at 20. Assuming the usual arrangement, wherein the mirrors 13 and 15 are not exactly at right angles to one another, the field of the telescope is crossed by the usual interference fringes, which sweep across the field as the mirrors are moved. Optical elements placed in the path of the branch $b_2$ can be checked because of their influence on these fringes, as well known.

In Figure 1, the interferometer is set up to check an optical element 22, which may be any type of flat, prism or other optical element such as is commonly checked in interferometers. The element 22 is positioned on base 10 in the path of the parallel branch beam reflected by light splitter 12, and behind element 22 is positioned the mirror 15. The mirror 15 is provided with any suitable mounting arrangement, e. g., a small tripod, whereby it can be slid around for positional adjustment on the surface of base 10.

Figure 2:
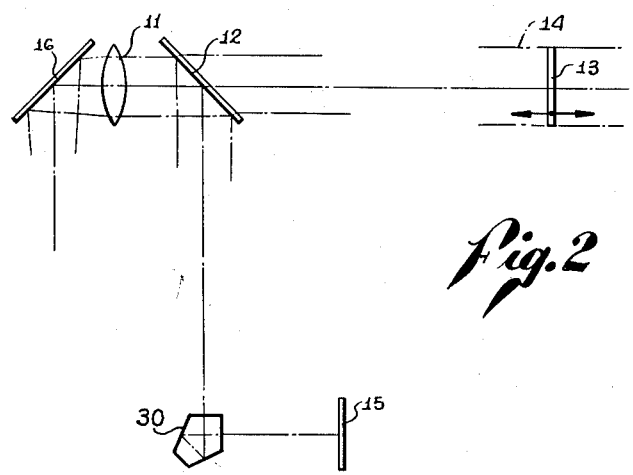
Figure 2 is a fragmentary portion of a portion of the interferometer of Figure 1 showing another illustrative work layout.

Figure 2 shows a portion of the instrument of Figure 1, set up to check a penta prism 30. In this case, the adjustable mirror 15 is positioned so as to be in the path $b_2$ of and normal to the parallel beam of the branch $b_2$ after traversing the prism 30. This figure is merely illustrative of the use of the work space area in the central portion of the base 10.

From what has now been said, the use of the present interferometer will be entirely clear to those skilled in the art, there being no necessity for describing herein any particular test procedures, since these are essentially the same as with other general purpose interferometers now well known in the art.

Several important advantages may be noted. The interferometer employs a single lens, rather than two lenses as in prior interferometers used for comparable purposes. The instrument, especially with the reflector at 16, is very compact, the operator's position being placed immediately in front of the area of the base 10 on which the piece being tested and the mirror 15 are located.

One of the most important advantages of the present interferometer is the ease by which the dividing mirror 12 can be compensated for local imperfections always found in optical glass. Noting the fact that the dividing mirror 12 is semi-reflective on its front rather than its rear face, it will be clear to those skilled in the art that rays reflected thereby to the mirror 15 will not pass through the dividing mirror 12, while rays transmitted therethrough in passing both to and from mirror 13 will be parallel to one another. Accordingly, an assumed small imperfection in the glass of mirror 12 is in a field of parallel light, and can accordingly be observed unambiguously by the eye of the observer at 20, so that compensation by figuring can be made directly in the right location. This is in contrast to well known general purpose interferometers of the prior art wherein a small imperfection in the glass of the dividing mirror is always in two non-parallel light paths through the dividing mirror for two parallel but spaced groups of rays of the collimator beam, resulting in the appearance of two imperfections, rather than one, with the consequence that the operator has no direct way of locating the imperfection that he seeks to compensate. Those skilled in the art of figuring mirrors will recognize the tremendous advantage accruing from an undoubled appearance of the imperfection to the operator. This advantage so facilitates the manufacture of interferometers that better and larger interferometers can be made, poorer optical glass can be employed (because figuring has been so greatly reduced in difficulty), and the expense of producing a general purpose interferometer to a given standard of perfection is materially reduced.

Figure 3:
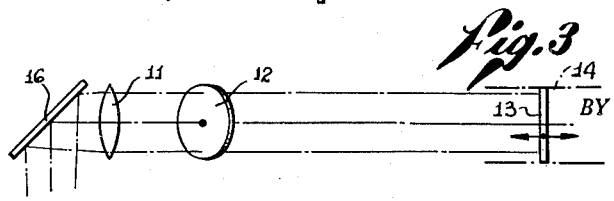
Figure 3 is a fragmentary portion of the interferometer of Figure 1 showing the light splitter rotated to a different position.

Figure 3 shows a fragmentary portion of Figure 1, with the dividing mirror 12 rotated through 90°, so as to send the reflected beam straight upwards. This arrangement enables checking of an optical element in an assembled instrument which would be too large to be accommodated with the mirror branch $b_2$ in the normal horizontal position, or in cases wherein it is more convenient to have the reflected beam at an angle to horizontal. It will of course be understood that in the mode of use suggested in Figure 3, the mirror 15 (not shown therein) will be positioned above or beyond the optical element under test.

From the above description, it can be appreciated that the interferometer of the invention is characterized by simplification, compactness, increased convenience, and added versatility.

I claim:
1. In an interferometer, the combination of: a single combined collimator and telescope lens, a mirror behind said lens at an axis of approximately 45° to the longitudinal axis of said lens, whereby the axis of the collimator has a substantially right angle bend, a beam splitter between said mirror and the focal point of said lens, so arranged as to provide an additional focal point for said lens, a point source of light at one of said focal points, the other furnishing a position for the eye of an observer, a dividing mirror positioned in front of said lens in the parallel beam of the lens and at right angles to the first mentioned mirror, and fully reflective mirrors in the paths of the portions of said parallel beam transmitted through and reflected by said dividing mirror.

2. In an interferometer, the combination of: a single combined collimator and telescope lens, a mirror behind said lens at an axis of approximately 45° to the longitudinal axis of said lens, whereby the axis of the collimator has a substantially right angle bend, a beam splitter between said mirror and the focal point of said lens, so arranged as to provide an additional focal point for said lens, a point source of light at the last mentioned focal point, the first mentioned focal point furnishing a position for the eye of an observer, a dividing mirror positioned in front of said lens in the parallel beam of the lens and at right angles to the first mentioned mirror, and fully reflective mirrors in the paths of the portions of said parallel beam transmitted through and reflected by said dividing mirror.

3. The subject matter of claim 2, wherein the dividing mirror is adjustably rotatable about the parallel beam of the lens.

4. In an interferometer, the combination of: a single combined collimator and telescope lens, a beam splitter between said lens and its focal point, so arranged as to provide an additional focal point for said lens, a point source of light at one of said focal points, the other furnishing a position for the eye of an observer, a dividing mirror with a semi-reflective surface on its first surface angularly positioned in front of said lens in the parallel beam of the lens, and fully reflective mirrors in the paths of the portions of said parallel beam transmitted through and reflected by said dividing mirror.

References Cited in the file of this patent

UNITED STATES PATENTS

| 2,151,631 | Williams | Mar. 21, 1939 |
| 2,256,804 | Hurley | Sept. 23, 1941 |
| 2,688,899 | Rantsch | Sept. 14, 1954 |

FOREIGN PATENTS

| 569,046 | Great Britain | May 2, 1945 |

OTHER REFERENCES

Williams, W. E.: Applications of Interferometry, published in 1930, fourth edition in 1950, John Wiley & Sons, New York, New York, pages 66 and 67 cited.

Candler, C.: Modern Interferometers, published in 1951 by Hilger & Watts Ltd., London, pages 136 and 137 cited.